March 26, 1968   G. A. DOTTO   3,374,689
WORM GEAR ESCAPEMENT
Original Filed July 27, 1964   4 Sheets-Sheet 2

INVENTOR.
GIANNI A. DOTTO
BY Robert Levine
ATTORNEY

INVENTOR
GIANNI A. DOTTO
BY Robert Levine
ATTORNEY

March 26, 1968 G. A. DOTTO 3,374,689
WORM GEAR ESCAPEMENT
Original Filed July 27, 1964 4 Sheets-Sheet 4

INVENTOR
GIANNI A. DOTTO
BY
Robert Levine
ATTORNEY

United States Patent Office 3,374,689
Patented Mar. 26, 1968

3,374,689
WORM GEAR ESCAPEMENT
Gianni A. Dotto, Dayton, Ohio, assignor to P. R. Mallory & Co. Inc., Indianapolis, Ind., a corporation of Delaware
Original application July 27, 1964, Ser. No. 385,402, now Patent No. 3,307,417, dated Mar. 7, 1967. Divided and this application Jan. 16, 1967, Ser. No. 632,473
7 Claims. (Cl. 74—426)

ABSTRACT OF THE DISCLOSURE

A worm gear escapement including a spring, a shaft having an off center portion, a pin coupled to the off center portion and a slotted retaining means. The off center portion of the shaft, the pin and the slotted retaining means cooperating so as to translate a rotary motion to an intermittent motion.

---

This is a division of application Ser. No. 385,402, filed July 27, 1964, now U.S. Patent 3,307,417.

The present invention relates to an escapement, more particularly to escapements imparting an intermittent or step-by-step rotary motion output from a substantially constant rotary motion input. Such timed, intermittent rotary motion escapements are employed to periodically actuate control devices such as a switch means that in turn regulates the time sequence of operations embodied in washing machines and other similar devices.

In a device of this general nature, it is desirable that the escapement be actuated after a predetermined interval of time has elapsed. The escapement operates a control device such as a switch means having as a component thereof a series of cam operated switches. The escapement with which the present invention is concerned is of the type having a substantially constant rotary motion input which is translated by the novel escapement into an intermittent, snap rotary motion output. The device would necessarily include a drive motor, a drive gear, an escapement, and a switch means that sequentially actuates a plurality of electrical circuits.

In control timer utilizing escapements, it is desirable that the timer be manually operable to modify the duration or sequence of operation by either shortening or skipping over the particular operations entirely. For this purpose the novel timer of the present invention is provided with a manually operable means coupled to a cam shaft so that an operator is able to modify the duration or sequence of operations of the timer in accordance with the desires of the operator.

Several escapements presently available impart an intermittent or step-by-step snap rotary motion output from a substantially constant rotary motion input and are used in conjunction with a switch means to form a control timer. These several escapements utilize means for storage of energy during a first portion of a cycle, the storage cycle, and/or subsequently releasing the stored energy so stored during a second portion of the cycle, the release cycle. Generally, these escapements are satisfactory for limited purposes and are usually bulky and complicated and slow in operation. In the typical escapement the driving force is stored for a predetermined interval of time by a leaf spring that is either expanded or compressed thus storing energy. When the leaf spring is released from its expanded or from its compressed condition, the energy so stored provides a driving torque for a ratchet wheel and its associated driving means.

The use of an intermittent driving means provides the facility of periodic actuation of a particular event but in addition the driving means provides a method whereby switch contacts are displaced from a first contact to a second contact with such velocity that the contacts are not damaged for arcing does not occur between the contacts. Arcing occurs when a switch contact is slowly withdrawn from engagement with a first contact. It is seen the intermittent release of stored energy over a relatively short period of time is transferred to a ratchet wheel and then to a cam operated means which means controls the sequential operation of a plurality of switch devices.

The present invention provides an intermittent driving means whereby the leaf spring is replaced by a worm gear mechanism that is a simple, efficient, inexpensive, accurate, effective means that provides an intermittent driving force that regulates the sequential operation of a control timer.

Therefore, it is an object of the present invention to provide a novel rotary motion translating means utilized to translate a slow, continuous rotary motion to a rapid, intermittent rotary motion.

Another object of the present invention is to provide an escapement means that has a more positive, high velocity intermittent driving force.

Yet another object of the present invention is to provide an escapement in which each impulse or jump has a precise amount of travel without overtravel.

Another object of the present invention is to provide a novel worm gear escapement mechanism for actuating a plurality of multicontact electric switches, the worm gear escapement being inexpensive and accurate in construction, and more positive in its driving force.

Yet another object of the present invention is to provide a worm gear escapement mechanism having a pin driven over camming surfaces which camming surfaces include rise and fall contours which contours provide a means whereby a driving force is stored and subsequently released at predetermined intervals of time.

Still another object of the present invention is to provide a novel worm gear escapement possessing improved operating characteristics.

A further object of the present invention is to provide a worm gear escapement mechanically coupled to a plurality of multi-contact switches, the escapement having optimum reliability characteristics afforded by a construction having a minimum number of components.

The present invention in another of its aspects, relates to novel features of the instrumentalities of the invention described therein for teaching the principal object of the invention and to the novel principles employed in the instrumentalities whether or not these features and principles may be used in the said object and/or in the said field.

With the aforementioned objects enumerated, other objects will be apparent to those persons possessing ordinary skill in the art. Other objects will appear in the following description, appended claims, and appended drawings. The invention resides in the novel construction, combination arrangement and cooperation of elements as hereinafter described and more particularly as defined in the appended claims.

The appended drawings illustrate several novel and different embodiments of the present invention and are constructed to function in the most advantageous modes devised for the practical application of the basic principles involved in the hereinafter described invention.

Figure 1:
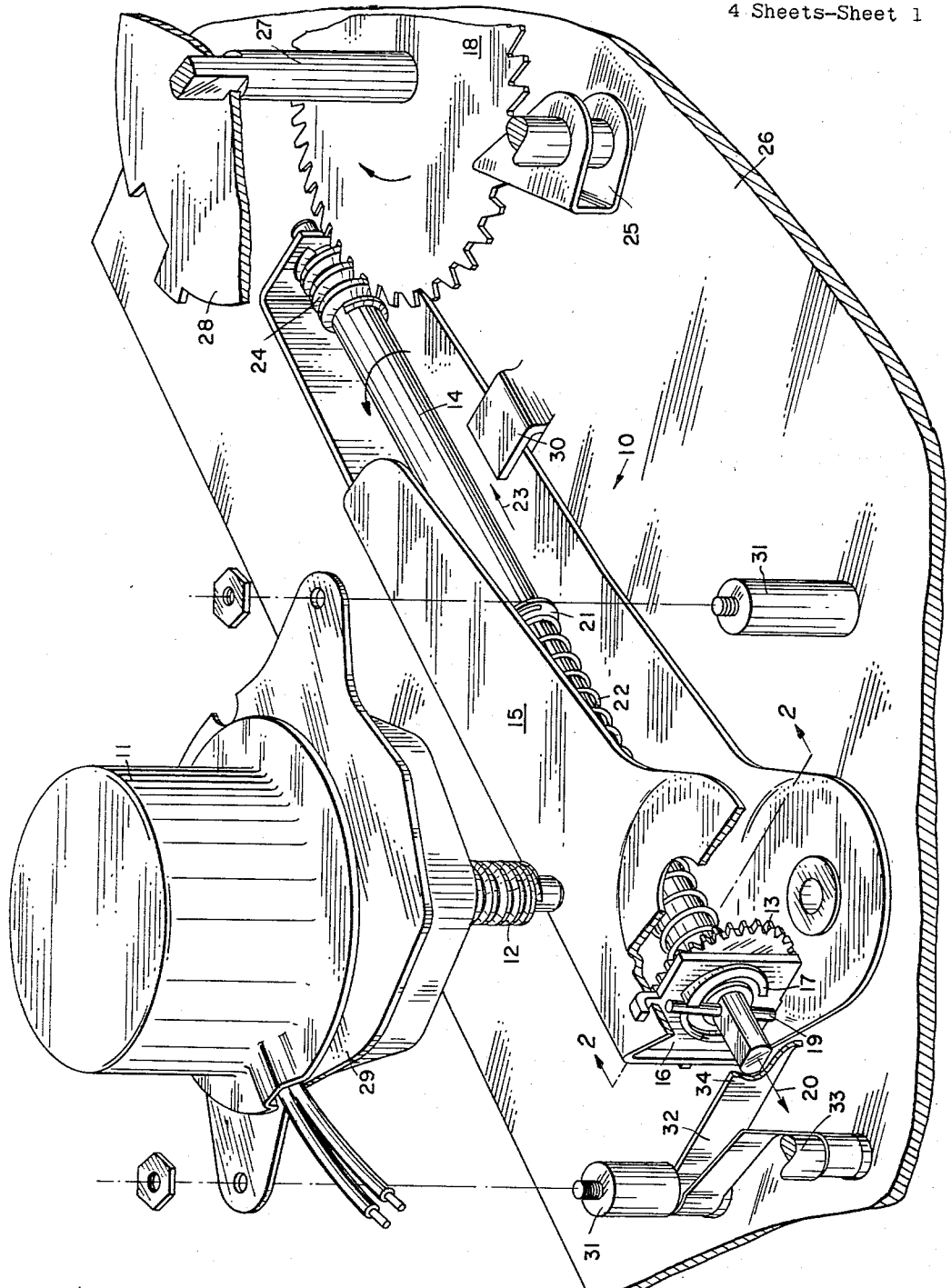
FIGURE 1 is a perspective view of the present invention illustrating the novel worm gear mechanism.

Generally speaking, the means and methods of the present invention relate to escapements for timing devices through the use of which it is possible to selectively control the sequential operation of a plurality of cam operated switches. The escapement of the present invention utilizes a drive means for providing a substantially constant rotary motion output. A gear reduction means is coupled to the drive means to effectively reduce the rotary motion output of the drive means to a predetermined speed. An escapement, more particularly a worm gear escapement, is mechanically coupled to the gear reduction means. The escapement includes an actuating means, preferably a shaft rotatable in a predetermined direction. A coded indicia follower means, preferably a pin, is fixedly coupled to the shaft and rotatable therewith. A plurality of coded indicia, preferably cams, are positioned concentric with the axis of the shaft. The coded indicia have rise and fall peripheral contours which the pin traverses as the shaft to which it is coupled rotates. As the shaft rotates, a compression spring means is compressed thereby storing energy as the pin rises along the rise contours of the cams as a result of the rotation of the shaft. The compressed spring releases the stored energy as the pin falls along the fall contours of the cams. A worm gear coupled to the shaft provides a driving force to a ratchet means as the pin falls along the fall contours of the cams.

More particularly, the present invention relates to a worm gear escapement including a mounting means and a retaining means pivotally coupled to the mounting means; the retaining means carrying a shaft rotatably journalled thereto. A coded indicia follower means, preferably a pin, is fixedly coupled to the shaft and is rotatable with the shaft. A plurality of coded indicia, preferably cams, are fixedly coupled to the retaining means at a right angle to the longitudinal axis of the shaft. Each of the cams are concentric with the shaft and each of the cams has an arcuate extent of about 180 degrees. The cams include alternate rise and fall peripheral contours upon which the pin rides as the shaft rotates. A compression spring wound about the shaft is compressed as the pin rises on the rise contour of the cams thereby storing energy. The compressed compression spring releases the stored energy as the pin falls along the fall contours of the cams. A worm gear is fixedly coupled to the shaft. The worm gear is rotationally displaced as the tension spring is compressed, however, the rotational displacement of the worm gear does not rotationally displace a ratchet means coupled to the worm gear. The worm gear is linearly displaced as the stored energy of the tension spring is released. It is seen that the worm gear does not experience a rotational displacement during the release of the stored energy. The ratchet is actuated by the linear displacement of the worm gear so as to provide a driving torque for an associated cam shaft. The ratchet is displaced with an intermittent motion of a predetermined increment and magnitude.

Another embodiment of the present invention is an escapement including a mounting means and a retaining means pivotably coupled to the mounting means. The retaining means has two legs spaced apart in parallel relationship. A slot of predetermined length and position is cut into each leg of the retaining means. A shaft is rotatably journalled to the retaining means by any suitable means such as bearings or the like. An off center shaft is milled from the shaft, the off center shaft having its longitudinal axis spaced apart in parallel relationship to the longitudinal axis of the shaft. A pin of predetermined length is fixedly coupled to the off center shaft and at a right angle to longitudinal axis of the off center shaft. The pin and one of the slots engage so as to prevent displacement of the pin. An off center aperture of a gear interfits with the off center shaft such in such a manner that as the gear is rotated, the off center shaft is displaced through an arc whereas the shaft is substantially maintained in an initial position. A torsion spring wound about the shaft and fixedly coupled thereto has one end coupled to the constantly rotating gear is torsionally displaced as the shaft is maintained in its initial position and the gear rotating thereby storing energy. As the arcuate displacement of the gear approaches 180 degrees from an initial position, the pin disengages with one of the slots thereby releasing the stored energy of the spring thereafter rapidly rotating the pin and the shaft through an arc of about 180 degrees. After rotating through the arc of about 180 degrees, the pin engages the second of the two slots which slot prevents further rotational displacement. A worm gear is coupled to the shaft and rotatable therewith. A ratchet is coupled to the worm of the worm gear, the ratchet is actuated by the rotational displacement of the worm gear.

Referring now to the drawings, which illustrate the preferred embodiments of the present invention, the escapement apparatus is generally indicated by numeral 10. A drive means 11 which can be any suitable electrical drive means such as an electric motor or the like is coupled to a rotatable worm gear 12 that is continuously driven in a constant rotary fashion. It is seen, however, that the drive means of the worm gear could be intermittent if desired. Worm gear 12 is positioned so as to mesh with reduction gear 13 and thereby mechanically displace the reduction gear in the counter-clockwise direction. Reduction gear 13 is fixedly coupled to shaft 14 so that rotational displacement of the reduction gear also rotationally displaces the shaft in a like manner and in a like direction.

A retaining means 15 rotatably journals in its opposite extremities shaft 14. It is seen that shaft 14 could have either a floating characteristic with respect to the opposite extremities of the retaining means or that the shaft could be rotatably coupled to the extremities by any suitable means such as bearings or the like. The axis of the shaft is substantially parallel to the longitudinal axis of the retaining means as shown in FIGURE 1. The extremity of shaft 14 to which gear 13 is fixedly coupled is retained by end facing 16 of the retaining means. Gear 12 is spaced from end facing 16 by the thickness of a washer (not shown). The washer is utilized to prevent the gear from frictionally rubbing against the end facing, such friction causing undue gear wear and as a result thereof cause inaccuracies to exist in the escapement. Mounted on the front side of the end facing, the face opposite the face that abuts the washer, is coded indicia 17. The coded indicia comprises two cams, each cam including alternate rise and fall contours. The apex of the rise portion of the contour is equal in height to approximately the distance between the valleys of adjacent teeth of ratchet 18. A coded indicia follower means 19, preferably a pin, is securely coupled to shaft 14 and is so placed as to ride on the periphery of the coded indicia. Pin 19 is perpendicular to and passes through the longitudinal axis of the shaft. FIGURE 1 shows that the periphery of the coded indicia or cams has a rise portion that is substantially 180 degrees in length. Thereafter the fall portion is substantially at a right angle to the rise portion thus making the fall portion substantially instantaneous back to an initial position.

As disclosed hereinbefore, pin 19 rides on the periphery of the cams and therefore the pin will follow the contour of the cams or coded indicia. The rise portion of the coded indicia displaces shaft 14 along its longitudinal axis in the direction of arrow 20. Also the displacement of the shaft is along a line tangent to the periphery of ratchet 18. In so doing a ring or washer 21 fixedly coupled to shaft 14 compresses compression spring 22 that is wound about shaft 14 between gear 13 and ring 21. Compression of the compression spring stores energy until such time as the shaft is permitted to return to its initial position at which time the stored energy of the compression spring is released and manifests itself as a driving force for ratchet 18. Shaft 14 is allowed to return to its initial position when pin 19 reaches the fall portion of the coded indicia. As pin 19 falls, shaft 14 is displaced in the direction of arrow 23. In so doing the energy stored by the compression spring is released and as a result thereof the shaft is rapidly displaced in the direction of arrow 23. A worm 24 is fixedly coupled to the extremity of the shaft opposite the extremity thereof to which gear 13 is coupled. Worm 24 is rapidly displaced in the direction of arrow 23, as a result of the rapid displacement of shaft 14. The length of the displacement in the direction of arrow 23 approximates the length of the fall portion of the coded indicia or the cams which as disclosed hereinbefore is substantially equal to the distance between the adjacent valley portions of adjacent ratchet teeth of ratchet 18. It is seen that the displacement of the ratchet in the clockwise direction approximates the length of one tooth of the ratchet.

The pitch of the worm 24 is such that as shaft 14 rotates in the counter-clockwise direction, the displacement of the shaft and the worm in the direction of arrow 20 does not displace ratchet 18 in the counter-clockwise direction. Likewise, because of the pitch of the worm 24 and the shape of the mating ratchet teeth, displacement of shaft 14 in the direction of arrow 23 will displace ratchet 18 in the clockwise direction through an arc approximately equal to the distance between the adjacent valleys of adjacent ratchet teeth. Pawl 25 is pivotally staked to mounting frame 26 by any suitable means such as a stake or fixed stud. The pawl interfits with a valley of the ratchet in such a manner so as to permit motion of the ratchet in the clockwise direction only. The function of the pawl is to prevent displacement of the ratchet in the counter-clockwise direction. Counter-clockwise movement is a retrograde movement which would have a deleterious effect on the ability of a control timer to perform sequential operations at a predetermined time after the initiation of the timing cycle.

A cam shaft 27 is rotatably journalled to the mounting frame by any suitable means such as by bearings (not shown). Fixedly coupled to an extremity of the cam shaft is ratchet 18. As ratchet 18 is displaced in the clockwise direction by the intermittent movement in the direction of arrow 23 by worm 24, the cam shaft is likewise displaced in the clockwise direction. It is seen that the ratchet provides a driving torque for the cam shaft. Fixedly coupled to the cam shaft is a plurality of cams 28 having on their respective peripheries coded indicia of alternate rise and fall contours. Associated with each cam is a switch (not shown). The follower arm of a follower switch (not shown) ride on the peripheral contours of a cam and the switch is actuated in accordance with the rise and fall contours of the associated cam. It is seen that the alternate rise and fall contours control the sequential operation of the switch means.

Retaining means 15 is pivotally coupled to mounting frame 26 by rotatable worm gear 12, the axis of which serves as a pivot point for the retaining means. As disclosed hereinbefore, gear 12 is coupled to driving means 11 in such a manner that housing 29 of the driving means overlies the pivotable point of the retaining means so as to maintain the retaining means in a predetermined vertical position with respect to mounting frame 26. An L-shaped tab 30 is placed with an extremity of the retaining means containing the worm gear to prevent vertical displacement of this portion of the retaining means.

Driving means 11 is securely coupled to mounting frame 26 by any suitable means such as a plurality of stakes 31. Stakes 31 serve several purposes the most obvious of which are to predeterminately seat the driving means with respect to worm gear 12, to prevent unnecessary and deleterious oscillation of the housing of the driving means, and to serve as a means to prevent vertical displacement of retaining means 15.

An S-shaped spring 32 has one curved portion thereof seated partially around one of the stakes 31 and a second curved portion thereof seated partially around a post 33. An arm 34 of the S-shaped spring overlies the end of shaft 14 opposite the extremity of the shaft that has thereon worm 24. As disclosed hereinbefore the retaining means is pivotable about the axis of worm 12. Arm 34 of the S-shaped springs displaces the axis of the shaft in such manner as to displace worm 24 into engagement with ratchet 18. In addition when shaft 14 is displaced in the direction of arrow 20, spring 32 has its arm 34 displaced in the direction of arrow 20 thus storing energy. As shaft 14 is displaced in the direction of arrow 23 the energy so stored by the displacement of the S-shaped spring is released and therefore aids in displacing shaft 14 in the direction of arrow 23.

Figure 2:
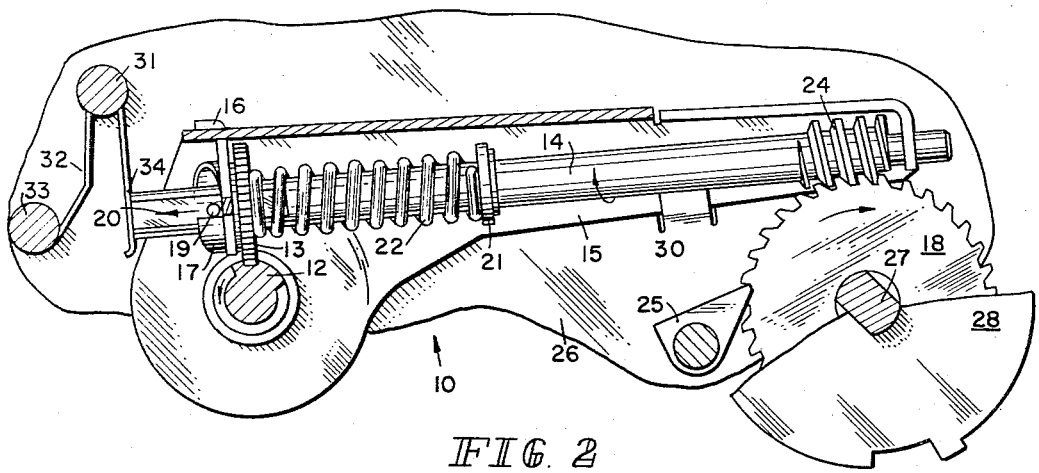
FIGURE 2 is an enlarged sectional view of the present invention illustrating the worm gear mechanism in its initial position taken across the lines 2—2 of FIGURE 1.
Figure 3:
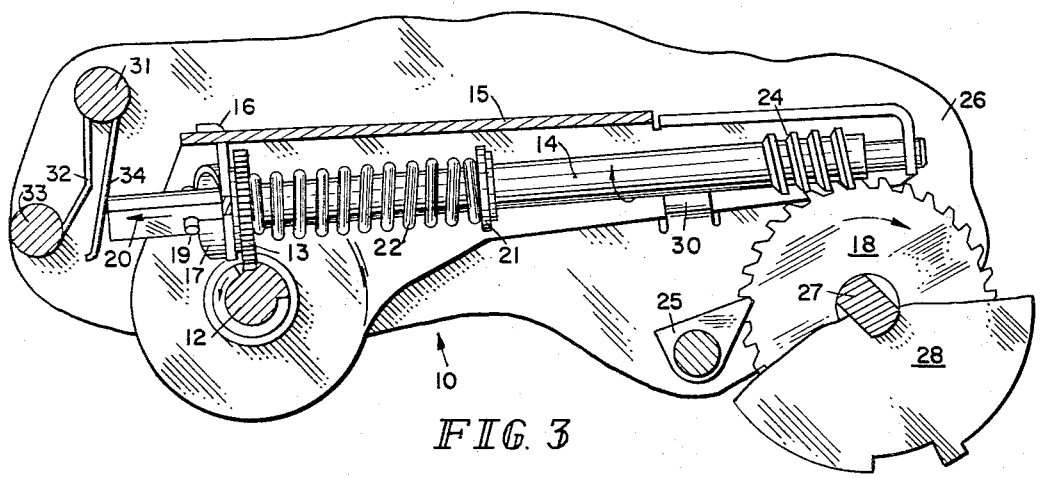
FIGURE 3 is an enlarged sectional view of the present invention illustrating the worm gear immediately prior to the actuation of a ratchet by the worm gear taken across the lines 2—2 of FIGURE 1.
Figure 4:
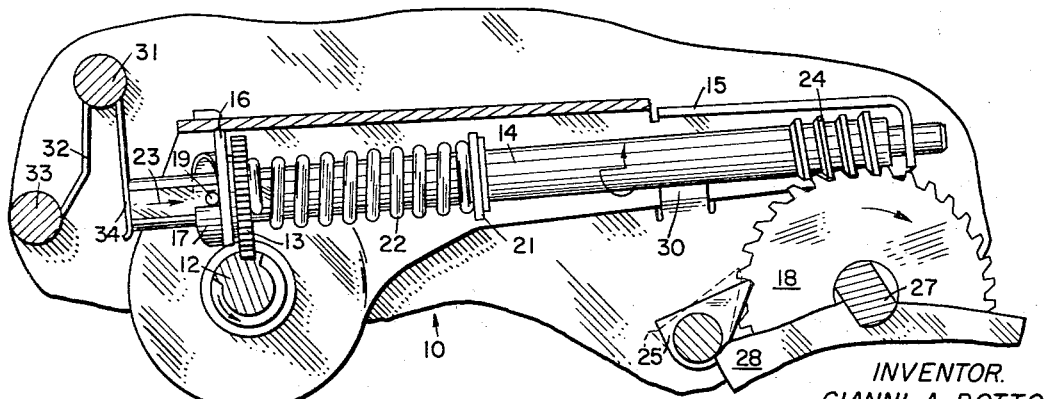
FIGURE 4 is an enlarged sectional view of the present invention illustrating the worm gear immediately subsequent to the actuation of a ratchet by the worm gear taken across the lines 2—2 of FIGURE 1.

FIGURES 2, 3 and 4 more clearly illustrate the operation of the novel escapement. A driving means 11 such as an electric motor rotates the worm gear with a constant rotary motion in the counter-clockwise direction. Worm gear 12 serves not only to translate the electrical energy of the motor to a rotatable mechanical energy but in addition serves to reduce the velocity of the mechanical output of the motor. Gear 12 meshes with speed reduction gear 13 to rotate the reduction gear in the counter-clockwise direction at a predetermined peripheral speed. Gear 13 is fixedly coupled to a predetermined portion of shaft 14, thus the rotating gear rotationally displaces shaft 14 in the counter-clockwise direction with a constant peripheral speed. As shaft 14 is rotated in the counter-clockwise direction, pin 19 perpendicular to the longitudinal axis of the shaft and projecting beyond the outer periphery of the shaft rides up the rise portion of the coded indicia 17. Riding up the coded indicia rotatably displaces not only the pin in the direction of arrow 20 but also rotatably displaces shaft 14 in the direction of arrow 20. In so doing compression spring 22 wound around shaft 14 is compressed between ring 21 and gear 13 thereby storing energy. Pawl 25 prevents a counter-clockwise displacement of the ratchet as worm 24 is rotationally displaced in the direction of arrow 20. The coded indicia is broken into two arcuate portions that are concentric about the longitudinal axis of shaft 14. The arcuate extent of each portion of the coded indicia is about 180 degrees. The longitudinal displacement of the shaft is equal to the width of one of the teeth of the ratchet wheel. It is seen that the rise portion of the arcuate portion of the coded indicia in the longitudinal direction must be substantially equal to the width of a ratchet tooth. As pin 19 falls along the fall portion of the coded indicia, the force stored by the compression spring is released as a driving force that rapidly displaces the shaft in the direction of arrow 23. Pawl 25 because of its construction and the fabrication of the ratchet teeth is a driving force acting in the clockwise direction causing a clockwise displacement of the ratchet. Displacement of the ratchet imparts a clockwise driving torque that displaces the cam shaft carrying a plurality of cams 28 which action actuates a plurality of switches associated therewith. It is seen that the motion of shaft 14 imparted to ratchet 18 as a driving torque is intermittent and at predetermined intervals.

Figure 5:
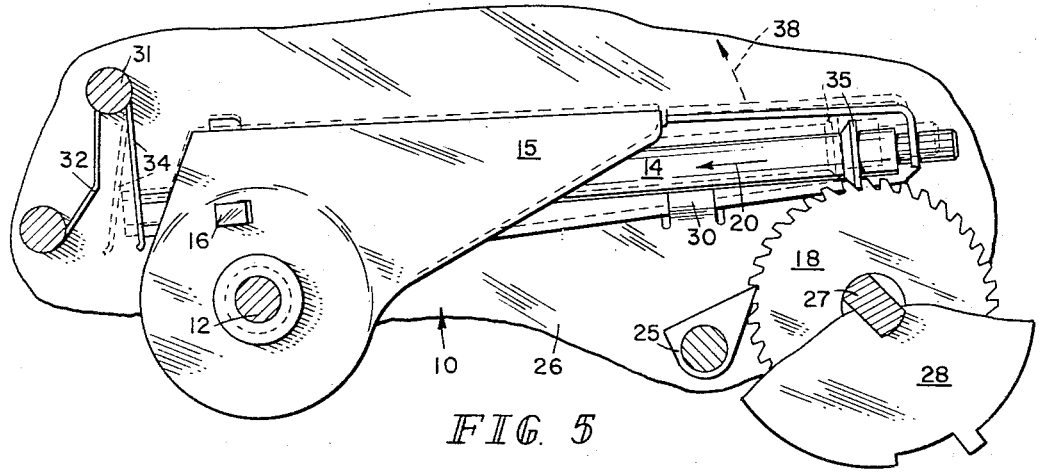
FIGURE 5 is an enlarged top view with portions thereof cut away of an embodiment of the present invention illustrating a shaft carrying a Belleville washer and showing the movement of the shaft and associated washer in full and dotted lines respectively.
Figure 6:
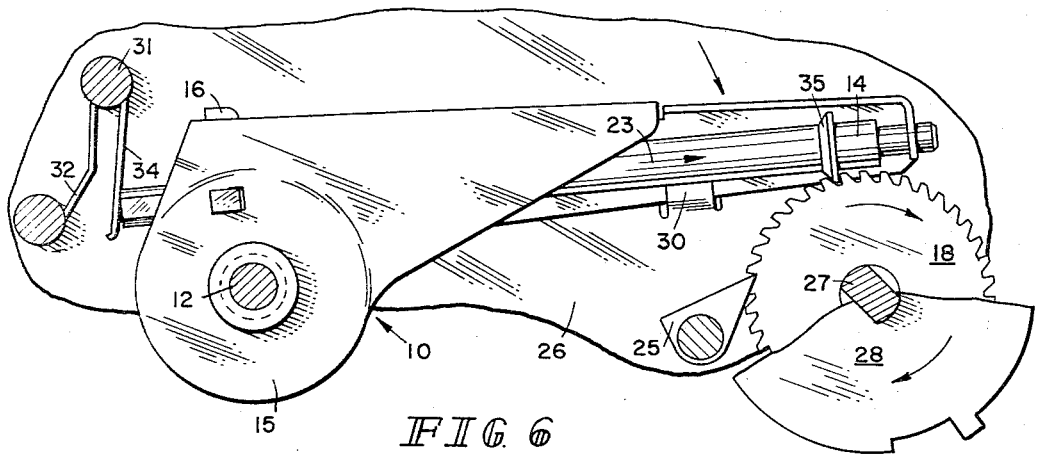
FIGURE 6 is an enlarged top view with portions thereof cut away of the embodiment of FIGURE 5 illustrating the position of the shaft and associated Belleville washer immediately prior to the intermittent, forward movement of the shaft.

FIGURE 5 and FIGURE 6 illustrate an embodiment of the present invention whereby worm 24 is replaced by a Belleville washer 35 fixedly coupled to shaft 14. In the initial position, the Belleville washer is positioned in a valley between two adjacent ratchet teeth. The major plane of the washer is perpendicular to the longitudinal axis of shaft 14, thus it is seen that when pin 19 is on the rise portion of the coded indicia, the washer is displaced in the direction of arrow 20 as well as upwardly as indicated by the dotted lines of FIGURE 5. After the washer passes over the apex of the ratchet tooth, it falls into the valley of the adjacent tooth. Thereafter the pin falls along the fall contour of the cams releasing stored energy, which energy acts through the shaft to displace the ratchet in the clockwise direction as disclosed hereinbefore and as shown in FIGURE 6.

Figure 7:
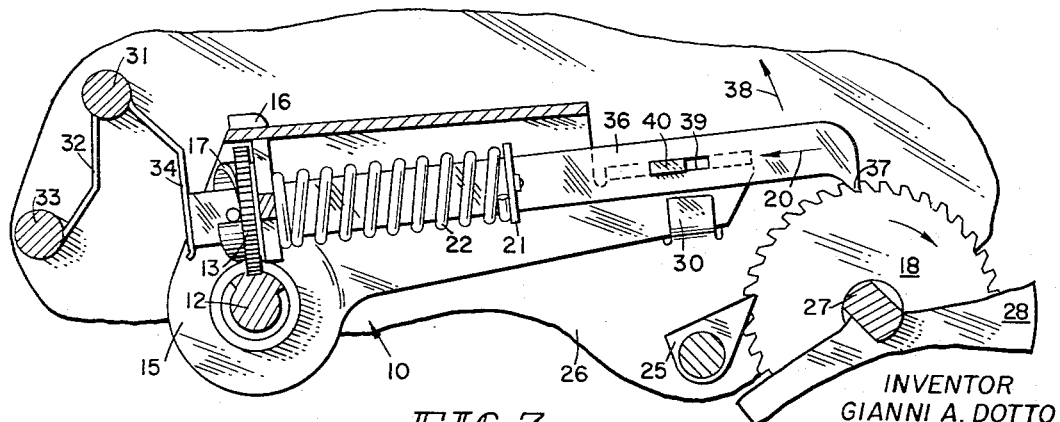
FIGURE 7 is an enlarged sectional view of another embodiment of the present invention illustrating an arm actuating means.

FIGURE 7 illustrates a third embodiment of the present invention wherein shaft 14 is replaced by a non-rotatable arm 36. Coded indicia 17 is securely coupled to gear 13 by any suitable means such as by press fitting or by welding. Pin 19 no longer rotates, however, it is perpendicular to the longitudinal axis of the arm as shown in FIGURE 7. As the coded indicia is rotated by gear 13, the pin rides up the rise portion thereof thereby displacing the arm in the direction of arrow 20. As a result of the displacement of the arm in the direction of arrow 20, tip 37 of the arm rides out of the valley between adjacent ratchet teeth. Upon reaching the apex of a ratchet tooth, the tip travels therealong until it reaches an adjacent valley portion whereupon it falls into the adjacent valley portion of an adjacent ratchet tooth. Shortly thereafter pin 17 attains the fall portion of the coded indicia and thereafter falls along the fall portion. This action releases the energy stored by compression spring 22 displacing arm in the direction of arrow 23 with a powerful and rapid motion thereby providing a driving force. The movement of arm 36 displaces the ratchet in the clockwise direction, the ratchet providing a driving torque to an associated cam shaft. A slot 39 cut in arm 36 interfits with a pin 40. The cooperation of the slot and the pin serves to position the retaining means with respect to the arm regardless of the position of the arm on the outer periphery of the ratchet thereby assuring proper cooperation between the various elements of the escapement.

Figure 8:
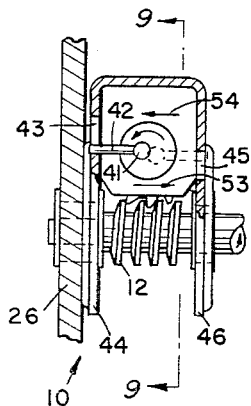
FIGURE 8 is an enlarged partial front view of the present invention illustrating a shaft incorporating therein an off center shaft and an associated pin to provide an actuating means, the intermittent movement of which is illustrated in full and dotted lines respectively.
Figure 9:
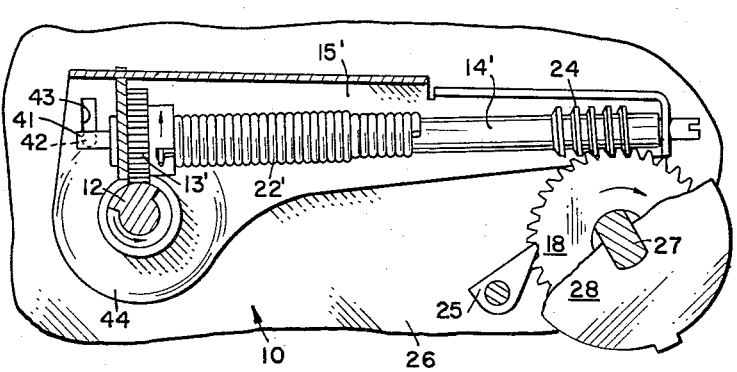
FIGURE 9 is an enlarged sectional view of the invention of FIGURE 8 illustrating the off center actuating means and a cooperating torsion spring, the sectional view taken across the lines 9—9 of FIGURE 8.
Figure 10:
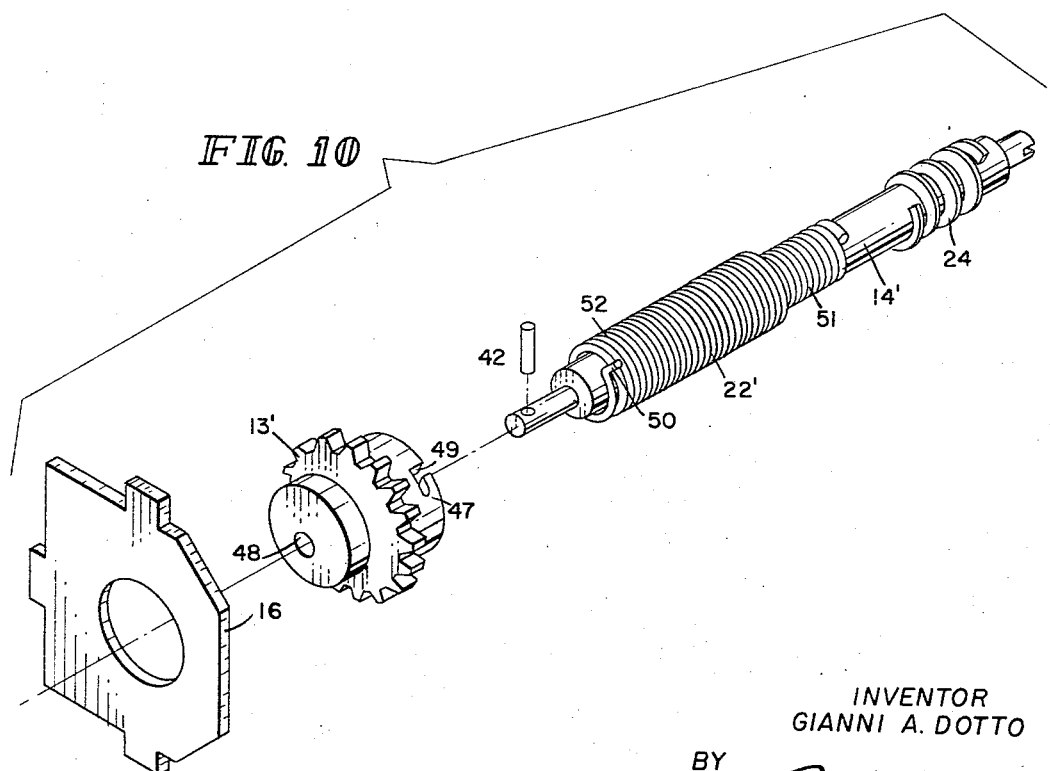
FIGURE 10 is an enlarged perspective view of the actuating means of FIGURE 8.

The fourth embodiment of the present invention is shown in FIGURES 8, 9 and 10. An off center shaft 41 is milled from a portion of shaft 14'. The axis of the off center shaft will traverse an arc that has as its axis, the longitudinal axis of shaft 14'. A pin 42 is securely coupled to the off center shaft and projects therefrom at a right angle to the axis of the off center shaft. The pin is of sufficient length to interfit with a first slot 43 of predetermined length cut in leg 44 of retaining means 15'. The first slot is of sufficient length to permit arcuate movement by the pin into engagement with the first slot. A second slot 45 of predetermined length is cut in leg 46 of retaining means 15'. Leg 45 is parallel to and predeterminately spaced from leg 44. Slot 45 is cut into leg 46 in such a manner that pin 42 experiences rotational displacement through an arc of about 180 degrees when the pin disengages slot 43 and engages slot 45 or when pin 42 disengages slot 45 and engages slot 43.

A drive means (not shown) can be any suitable electrical drive apparatus such as an electric motor or the like is coupled to a rotatable worm gear 12 that is continuously driven in a constant rotary fashion. Worm gear 12 is rotatably positioned on mounting frame 26 to mesh with reduction gear 13'. The worm gear mechanically displaces the reduction gear in the counter-clockwise direction with a continuous motion. Reduction gear 13' carries a sleeve portion 47 that has an off center aperture 48 that interfits with the off center shaft. An L-shaped slotted portion 49 is cut into the sleeve 47 in such a manner that torsion spring 22' having an end portion 50 that is at a right angle with the longitudinal axis of the spring interfits with the L-shaped slot. Torsion spring 22' is comprised of two portions: a first portion 51 that is tightly wound about shaft 14' and a second portion 52 that is loosely wound about shaft 14'. The tightly wound first portion of the torsion spring positions the spring on shaft 14' whereas the loosely wound second portion serves to store rotational energy as the end portion 50 of the torsion spring is rotationally displaced from an initial position. It is seen that since the gear and associated sleeve have a substantially floating characteristic on shaft 14' displacement of the gear and associated sleeve rotationally displaces end portion 50 of the torsion spring without rotationally displacing shaft 14'. As end portion 50 is displaced in the counterclockwise direction, energy is stored by the second end portion of the torsion spring. Although gear 13' substantially floats on shaft 14' aperture 48 displaces the axis of the off center shaft through a predetermined arc that has as its axis the longitudinal axis of shaft 14'. As shown in FIGURE 8 and FIGURE 9 as gear 13' is rotationally displaced in the counter-clockwise direction, end portion 50 of the torsion spring is also rotationally displaced. Pin 42 interfitting with slot 43 prevents shaft 14' from being roationally displaced. Additional rotational displacement of end portion 50 further serves to store additional energy in the torsion spring. As disclosed hereinbefore, aperture 48 is positioned off center in the sleeve of the gear so as to interfit with the off center shaft 41. It is seen that as gear 13' is rotationally displaced, aperture 48 displaces the off center shaft through a predetermined arc. Displacement of the shaft through the predetermined arc gradually displaces pin 42 carried by the off center shaft in the direction of arrow 53. Displacement of the pin in the direction of arrow 53 gradually withdraws the pin from slot 43. As the off center shaft approaches an arcuate displacement of approximately 180 degrees, the pin disengages slot 43. Energy stored in the torsion spring is released thereby rapidly displacing shaft 14' in the counter-clockwise direction as illustrated by the dotted lines of FIGURE 8. Pin 42 after displacement through an arc of about 180 degrees engages slot 45. The engagement of the pin with slot 45 prevents further arcuate displacement of the pin. It is seen that since the off center shaft is an integral part of shaft 14' the shaft is likewise displaced through an arc of about 180 degrees providing a driving force for ratchet 18. A worm 24 on shaft 14' is displaced 180 degrees thereby rotationally displacing ratchet 18 in the clockwise direction approximately through an arc of about one tooth. The ratchet provides a driving torque to an associated cam shaft.

Further rotational displacement of the gear 13' displaces aperture 48 thereby arcuately displacing off center shaft 41. Pin 42 is displaced in the direction of arrow 54. As the off center shaft approaches an arcuate displacement of approximately 180 degrees, the pin disengages slot 45. Energy stored in the torsion spring is released thereby rapidly displacing shaft 14' in the counter-clockwise direction. Pin 42 after displacement through an arc of about 180 degrees engages slot 43. The engagement of the pin with slot 43 prevents further arcuate displacement of the pin. As the pin is rapidly displaced through an arc of about 180 degrees, shaft 14' is likewise displaced through an arc of about 180 degrees. The ratchet associated with the worm is advanced in the clockwise direction through an arc equal to about one ratchet tooth. Cam shaft 27 and cam 28 are likewise displaced in the clockwise direction through an arc equal to about one ratchet tooth.

While the invention is illustrated and described in its preferred embodiments, it will be understood that modifications and variations may be effected without departing from the scope of the novel concepts of this invention as set forth in the appended claims.

Having thus described my invention, I claim:

1. An escapement comprising: a mounting means; a retaining means pivotally coupled to said mounting means, said retaining means having a plurality of legs spaced apart in parallel relationship; a slot in each of said plurality of legs; a shaft rotatably journalled to said retaining means; an off center shaft milled from said shaft, a pin fixedly coupled to and at a right angle with the axis of said off center shaft, said pin and one of said slots engaging to prevent displacement of said shaft; a gear; an aperture of said gear interfitting with said off center shaft such that as said gear rotates said off center shaft rotates through an arc, a torsion spring including an end portion coupled to said gear, said spring torsionally displaced as said off center shaft is displaced by said gear thereby storing energy, as said arcuate displacement of said off center shaft approaches a predetermined arcuate displacement, said pin ceases to engage one of said slots thereby releasing said stored energy, said released energy rapidly rotating said pin and said shaft through said predetermined arc, thereafter said pin engages a second slot, said latter slot thus preventing further rotational displacement of said shaft; a worm gear coupled to said shaft and rotationable therewith; and a ratchet coupled to said worm gear, said ratchet actuated by said rotational displacement of said worm gear.

2. An escapement as claimed in claim 1, wherein said gear includes an off center aperture which interfits with said off center shaft such that rotational displacement of said gear arcuately displaces said off center shaft.

3. An escapement comprising: a mounting means; a retaining means coupled to said mounting means, said retaining means having a plurality of spaced apart legs; a slot in each of said plurality of legs; a shaft rotatably journalled in said retaining means; an off center shaft milled from said shaft, means fixedly coupled to said off center shaft, said means and one of said slots engaging to prevent displacement of said shaft; a gear; an aperture of said gear interfitting with said off center shaft such that as said gear rotates said off center shaft is displaced through an arc, spring means including an end portion coupled to said gear, said spring means storing energy as said off center shaft is displaced by said gear, as said arcuate displacement of said off center shaft approaches a predetermined arcuate displacement, said means ceases to engage one of said slots thereby releasing said stored energy, said released energy rapidly rotating said means and said shaft through said predetermined arc, thereafter said means engages a second slot, said latter slot thus preventing further rotational displacement of said shaft; a worm gear coupled to said shaft and rotationable therewith; and a ratchet coupled to said worm gear, said ratchet actuated by said rotational displacement of said worm gear, wherein actuation of said ratchet with an intermittent motion of a determined increment.

4. An escapement means as claimed in claim 3, wherein said gear includes an off center aperture which interfits with said off center shaft such that rotational displacement of said gear arcuately displaces said off center shaft.

5. An escapement means as claimed in claim 3, wherein said retaining means is pivotally coupled to said mounting means, said worm gear displaceable from engagement with said ratchet wheel as said retaining means is pivotally displaced.

6. An escapement means as claimed in claim 3, wherein said spring means is a torsion spring having one end coupled to said gear means and another end coupled to said shaft, displacement of said gear means torsionally displacing said torsion spring so as to store energy therein without rotationally displacing said ratchet means coupled to said worm gear.

7. An escapement means as claimed in claim 3, wherein said means engaging with said one of said slots is a pin means coupled to said shaft at a right angle with said off center shaft.

References Cited

UNITED STATES PATENTS

| | | | |
|---|---|---|---|
| 2,758,569 | 8/1956 | Peterson | 74—128 X |
| 3,115,785 | 12/1963 | Simmons | 74—125 |
| 3,307,417 | 3/1967 | Dotto | 74—426 |

MILTON KAUFMAN, *Primary Examiner.*